United States Patent
Johannsen

(10) Patent No.: US 9,656,707 B2
(45) Date of Patent: May 23, 2017

(54) HIGH SPEED METAL FACE SEAL

(71) Applicant: Caterpillar Inc., Peoria, IL (US)

(72) Inventor: Eric James Johannsen, Washington, IL (US)

(73) Assignee: Caterpillar, Inc., Peoria, IL (US)

(*) Notice: Subject to any disclaimer, the term of this patent is extended or adjusted under 35 U.S.C. 154(b) by 0 days.

(21) Appl. No.: 14/832,304

(22) Filed: Aug. 21, 2015

(65) Prior Publication Data

US 2017/0050689 A1 Feb. 23, 2017

(51) Int. Cl.
*F16J 15/34* (2006.01)
*B62D 55/15* (2006.01)

(52) U.S. Cl.
CPC .......... *B62D 55/15* (2013.01); *F16J 15/3436* (2013.01); *F16J 15/3464* (2013.01)

(58) Field of Classification Search
CPC ..... F16J 15/3436; F16J 15/3464; B62D 55/15
See application file for complete search history.

(56) References Cited

U.S. PATENT DOCUMENTS

| | | | |
|---|---|---|---|
| 4,094,516 A * | 6/1978 | Morley | F16J 15/34 277/380 |
| 4,176,848 A * | 12/1979 | Lafuze | E21B 10/25 175/371 |
| 4,183,542 A * | 1/1980 | Quartara | F16J 15/344 277/381 |
| 4,189,159 A * | 2/1980 | Domes | F16J 15/344 277/374 |
| 4,419,086 A * | 12/1983 | Condon | F16C 33/7809 277/366 |
| 4,747,604 A | 5/1988 | Nakamura | |
| 4,844,483 A * | 7/1989 | Iijima | F16J 15/162 277/382 |
| 5,560,621 A | 10/1996 | Zutz | |
| 6,047,969 A | 4/2000 | Hoefft et al. | |
| 7,347,290 B2 | 3/2008 | Yu et al. | |
| 7,708,285 B2 | 5/2010 | Grimanis et al. | |
| 7,744,169 B2 * | 6/2010 | Murakami | B62D 55/092 305/105 |
| 8,601,634 B1 | 12/2013 | Stunkard | |
| 9,115,809 B2 * | 8/2015 | Hasselbusch | F16J 15/344 |
| 9,488,280 B2 * | 11/2016 | Critchley | F16J 15/3404 |
| 2004/0026870 A1 * | 2/2004 | Maguire | F16J 15/344 277/377 |

(Continued)

*Primary Examiner* — Gilbert Lee
(74) *Attorney, Agent, or Firm* — Procopio, Cory, Hargreaves & Savitch LLP

(57) ABSTRACT

A face seal assembly and rotating assembly for a track machine are disclosed. The face seal assembly includes a first seal ring, an annular housing, a second seal ring, and a bias member. The first seal ring is fixed to a rotating part for rotation about an axis. The first seal ring includes a seal face and a radially outer surface press-fittingly confronting an annular bore in the rotating part. The annular housing is spaced axially inward from the first seal ring and rotationally fixed. The annular housing includes an axially inner surface and a radially inner surface. The second seal ring is disposed axially between the first seal ring and the annular housing. The second seal ring includes a seal face confronting the seal face of the first seal ring. The bias member is compressed between the annular housing and the second seal ring.

17 Claims, 3 Drawing Sheets

(56) References Cited

U.S. PATENT DOCUMENTS

| | | | |
|---|---|---|---|
| 2006/0181147 A1* | 8/2006 | Vik | B62D 55/15 305/103 |
| 2009/0243384 A1* | 10/2009 | Diekevers | B62D 55/0887 305/202 |
| 2013/0002010 A1* | 1/2013 | Hasselbusch | B62D 55/21 305/104 |
| 2014/0125116 A1* | 5/2014 | Weeks | B62D 55/20 305/100 |
| 2014/0125117 A1* | 5/2014 | Weeks | B62D 55/15 305/100 |

* cited by examiner

HIGH SPEED METAL FACE SEAL

TECHNICAL FIELD

The present disclosure generally pertains to face seal assemblies, and is more particularly directed to face seal assemblies for retaining lubricant in the vicinity of bearing surfaces between rotating parts.

BACKGROUND

Face seal assemblies are used near relative rotating components of tracked machines, such as track roller assemblies, idler assemblies, final drive assemblies, etc. These face seal assemblies are used retain lubricant and prevent foreign matter from reaching the rotating bearings of the relative rotating components.

Face seal assemblies usually include a pair of contacting seal rings formed of metal or other durable, hard material. The seal rings rotate relative to one another in face-to-face contact to provide a positive face seal. One of the seal rings is considered a dynamic seal ring and is associated with the relatively rotating portion of the rotating component (i.e., the portion of the rotating component that rotates relative to a stationary portion). The other seal ring is considered a stationary seal ring and is associated with relatively stationary portion of the rotating component (i.e., the portion of the rotating component relative to which the rotating component rotates). Each of the seal rings may be axially-movable relative to its associated portion of the rotating component. A resilient load ring is positioned on an angled portion of each seal ring to provide a force to bias seal rings toward each other to maintain constant sealing engagement.

U.S. Pat. No. 6,047,969 to Hoefft is directed to a metal-to-metal face seal assembly having a static seal ring secured to a rotating element, such as a track roller of a tracked machine. The static seal ring has a seal face, and a dynamic seal ring has a seal face in sealing engagement with the seal face of the static ring. The dynamic seal ring has a ramp thereon extending at 8 degrees relative to horizontal in a direction away from the seal face thereof. The face seal assembly further includes a seal housing, which may be the end collar of the track roller, having an annular ramp formed thereon confronting the ramp of the dynamic seal ring, which seal housing ramp extends at 10 degrees relative to horizontal. The ramps converge in a direction away from a seal plane defined by the mutually-engaging faces of the seal rings. A load ring disposed between the ramps is pre-compressed to its maximum strain level to provide the desired face loads on the seal faces.

The present disclosure is directed toward overcoming one or more of the problems discovered by the inventors or that is known in the art.

SUMMARY OF THE DISCLOSURE

In one embodiment, a face seal assembly is disclosed. The face seal assembly includes a first seal ring, an annular housing, a second seal ring, and a bias member. The first seal ring is fixed to a rotating part for rotation about an axis. The first seal ring includes a seal face and a radially outer surface press-fittingly confronting an annular bore in the rotating part. The annular housing is spaced axially inward from the first seal ring and rotationally fixed with respect to the axis. The annular housing includes an axially inner surface and a radially inner surface. The second seal ring is disposed axially between the first seal ring and the annular housing. The second seal ring includes a seal face confronting the seal face of the first seal ring. The bias member is compressed between the annular housing and the second seal ring.

In another embodiment, another face seal assembly is disclosed. The face seal assembly includes a first seal ring, an annular housing, a second seal ring, and a bias member. The first seal ring is fixed to a rotating part for rotation about an axis. The first seal ring includes a seal face and a radially outer surface press-fittingly confronting an annular bore formed in the rotating part. The annular housing is spaced axially inward from the first seal ring and rotationally fixed with respect to the axis. The annular housing includes an axially inner surface, a radially inner surface, and a transition region between the axially inner surface and the radially inner surface. The transition region has a variable radius. The second seal ring is disposed axially between the first seal ring and the annular housing. The second seal ring includes an axially outer surface, a radially outer surface, a transition region between the axially outer surface and the radially outer surface, and a seal face. The transition region has a variable radius. The seal face confronts the seal face of said first seal ring. The bias member is compressed between the annular housing and the second seal ring.

In yet another embodiment, a rotating assembly is disclosed. The rotating assembly includes a rotating part, a first seal ring, an annular housing, a second seal ring, and a bias member. The rotating part is rotatable about an axis. The rotating part includes an axially outer end, and an annular bore formed in the axially outer end. The first seal ring is fixed to the rotating part for rotation with the rotating part. The first seal ring includes a seal face and a radially outer surface press-fittingly confronting a radially inner surface of the annular bore formed in the rotating part. The annular housing is spaced axially inward from the first seal ring and rotationally fixed with respect to the axis. The annular housing includes an axially inner surface, a radially inner surface, and a concave surface between the axially inner surface and the radially inner surface. The concave surface has a variable radius. The second seal ring is disposed axially between the first seal ring and the annular housing. The second seal ring includes an axially outer surface, a radially outer surface, a concave surface between the axially outer surface and the radially outer surface, and a seal face. The concave surface has a variable radius. The seal face confronts the seal face of said first seal ring. The bias member is compressed between the concave surface region of the annular housing and the concave surface of the second seal ring.

DETAILED DESCRIPTION

Figure 1:
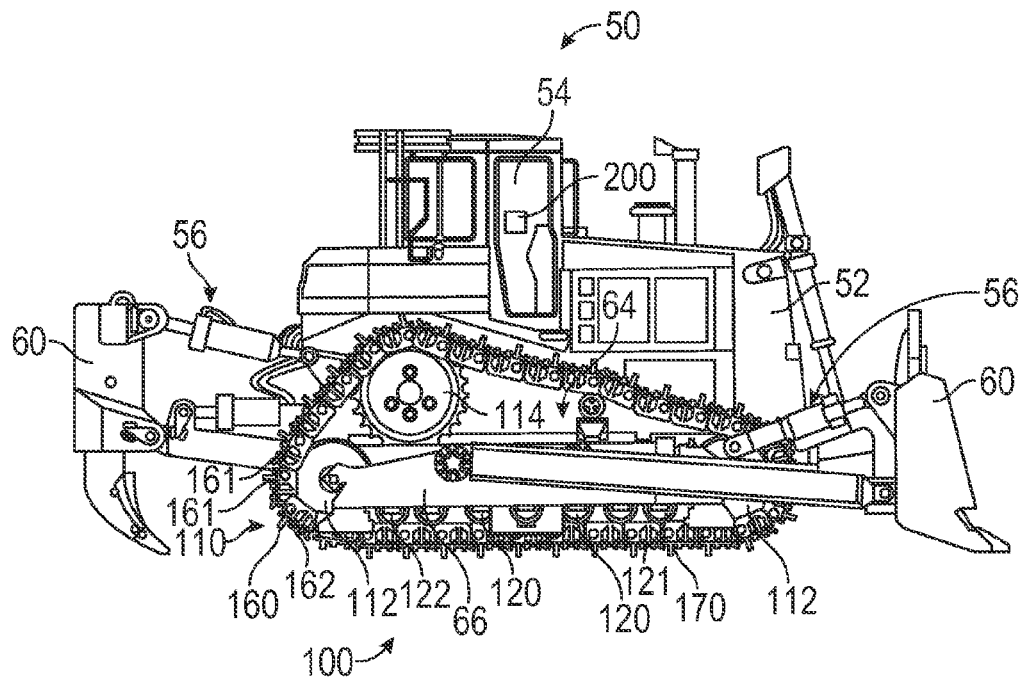
FIG. 1 is a side elevation view of an embodiment of a tracked machine including an undercarriage track system.

FIG. 1 is a side elevation view of an embodiment of a tracked machine 50 including an undercarriage track system 100. The term "machine" may refer to any machine that that performs some type of operation associated with an industry such as mining or construction, or any other industry known in the art, such as a hydraulic mining shovel, an excavator, a track-type tractor (bulldozer), a wheel loader, a cable shovel, a dragline, or the like. In the embodiment illustrated, the tracked machine 50 is a track-type tractor.

The tracked machine 50 may include a machine body 52, one or more hydraulic systems 56, one or more ground engaging implements 60, and an undercarriage structure 64. The machine body 52 may include a cab 54 to house a machine operator. An electronic control system 200 can be housed in the cab 54 that can be adapted to allow a machine operator to manipulate and articulate the ground engaging implements 60 for any suitable application.

A hydraulic system 56 may connect at one end to the machine body 52 and may support a ground engaging implement 60 at an opposing, distal end. In embodiments, the ground engaging implement 60 can be any suitable implement, such as a bucket, a clamshell, a blade, a shank, or any other type of suitable device. In the embodiment illustrated, a ground engaging implement 60 is connected to each end of the machine body 52.

The undercarriage structure 64 may include a supporting structure 66 and an undercarriage track system 100. The supporting structure 66 may connect the undercarriage track system 100 to the machine body 52 and may support the undercarriage track system 100.

The undercarriage track system 100 may include a track roller frame assembly 110 and an associated track chain assembly 160 on each side of the undercarriage structure 64. It will be appreciated that only one track roller frame assembly 110 and only one track chain assembly 160 is visible in FIG. 1.

Figure 2:
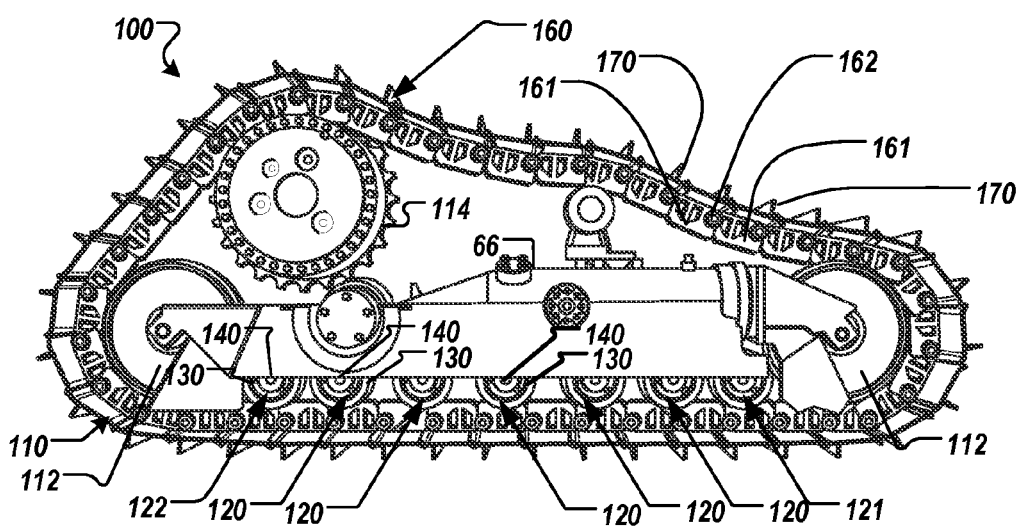
FIG. 2 is a side elevation view of the undercarriage track system.

FIG. 2 is a side elevation view of the undercarriage track system 100. Referring to FIGS. 1 and 2, each track roller frame assembly 110 may include one or more idler wheels 112, a drive sprocket wheel 114, and track roller assemblies 120. In the embodiment illustrated, an idler wheel 112 is coupled to each end of the supporting structure 66. The drive sprocket wheel 114 may also be coupled to the supporting structure 66. In the embodiment illustrated, the drive sprocket wheel 114 is adjacent the idler wheel 112 coupled to the aft end of the supporting structure 66. In other embodiments, with one idler wheel 112, the drive sprocket wheel 114 may be positioned at the end of the supporting structure 66 opposite the idler wheel 112. The drive sprocket wheel 114 is powered in forward and reverse directions by an engine of the tracked machine 50. In some embodiments, the drive sprocket wheel 114 may be coupled to the engine of the tracked machine 50 by a final drive. The drive sprocket wheel 114 drives the track chain assembly 160 to move the tracked machine 50.

Track roller assemblies 120 may be positioned between the ends of the supporting structure 66 and at least partially below the supporting structure 66. In the embodiment illustrated, the track roller assemblies 120 are positioned between the two idler wheels 112. In other embodiments, the track roller assemblies 120 are positioned between an idler wheel 112 and the drive sprocket wheel 114. The track roller assemblies 120 may include a front roller assembly 121 may be positioned adjacent the idler wheel 112 at the front end of the supporting structure 66 and a rear roller assembly 122 may be positioned adjacent the idler wheel 112 at the rear end of the supporting structure 66. Idler wheels 112 and track roller assemblies 120 may be configured to guide a track chain assembly 160 around the supporting structure 66.

In embodiments, each track chain assembly 160 includes track links 161 inter-connected and linked together by track pins 162 to form a closed chain. In the embodiment illustrated, track links 161 are connected to, such as by fastening, ground engaging shoes 170. The ground engaging shoes 170 or ground engaging portions may be configured to overlap. In other embodiments, each track chain assembly 160 includes track pads inter-connected and linked together. The track pads may include a track link and a ground engaging shoe that are cast or forged as an integral unit.

Figure 3:
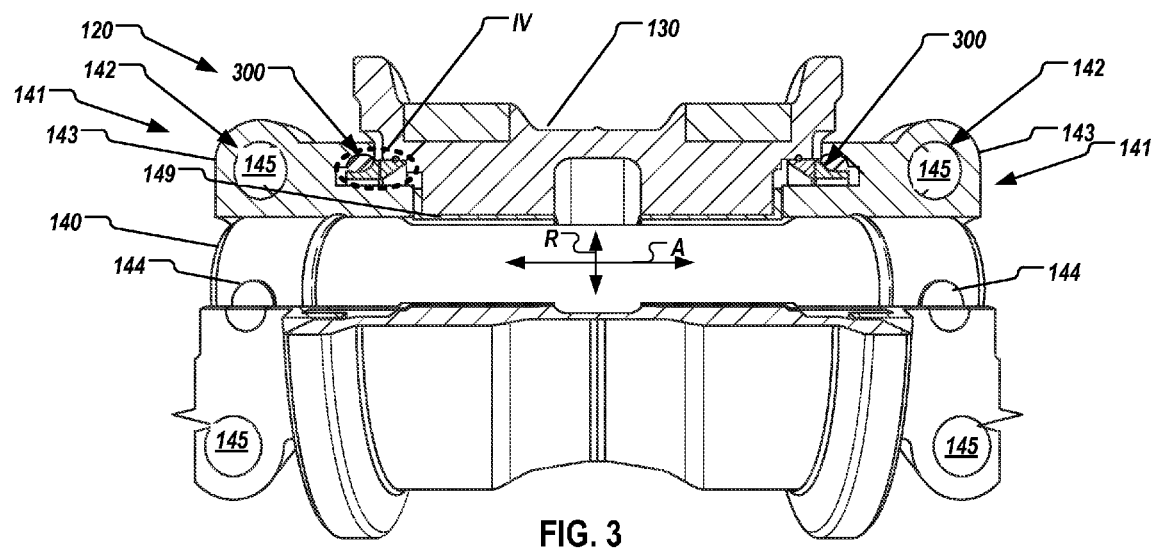
FIG. 3 is an elevation view, partially in cross-section of a track roller assembly including face seal assemblies in accordance with an embodiment of the present application.

Referring to FIG. 2, each track roller assembly 120 may include a roller 130, a roller shaft 140, and roller bearing sleeve 149 (shown in FIG. 3). Roller connection hardware 141 (shown in FIG. 3) and roller connectors 142 (Shown in FIG. 3) configured to couple the track roller assemblies 120 to the supporting structure 66 may also be provided. The roller connection hardware 141 may be located adjacent each end of roller 130 and may be configured to support each end of the roller shaft 140. The roller connection hardware 141 may prevent roller shaft 140 from rotating.

FIG. 3 is an elevation view, partially in cross-section of a track roller assembly 120 including face seal assemblies 300 in accordance with an embodiment of the present application. As used herein with respect to FIGS. 3-6, locations may be defined with reference to an axis A and radius R of the roller shaft 140 and roller 130. In other words, as used herein, references to radially inner and/or radially outer locations refer to locations along a radial R of the roller shaft 140. Similarly, as used herein, references to axially inner and/or axially outer locations refer to locations along the axis A of the roller shaft 140.

As discussed above, the track roller assembly 120 is mounted by the roller connection hardware 141 and roller connectors 142 between the supporting structure (66 in FIGS. 1 and 2) and the track chain assembly (160 in FIGS. 1 and 2) of the machine (50 in FIGS. 1 and 2). As illustrated, the roller connection hardware 141 includes a pair of end collars 143 aligned with a bore 144 through the roller shaft 140. The roller connectors 142 include mounting points 145 configured to attach to the supporting structure (66 in FIGS. 1 and 2) by known mounting mechanisms such as bolts, rods, pins, or any other mounting structure that may be apparent to a person of ordinary skill in the art.

The track roller assembly 120 comprises the roller 130 rotatably mounted on the roller shaft 140. A roller bearing sleeve 149 lines the inner wall of the roller 130 to provide a durable wear surface. The roller 130 is confined between the pair of end collars 143 of the roller connection hardware 141. The pair of end collars 143 is aligned with the bore 144 through the roller shaft 140. As a result, the end collars 143 are axial movement or play of the roller 130 between the end collars 143 may be prevented.

A face seal assembly, generally designated 300, is provided between the roller 130 and each of the end collars 143. As discussed above, the face seal assemblies 300 may be provided to retain lubricant, such as oil, in the vicinity of the surfaces of roller bearing sleeve 149 between the roller 130 and the roller shaft 140 and also prevent foreign matter from reaching such surfaces of the roller bearing sleeve 149. As the face seal assembly 300 on each end of the roller 130 may be substantially identical, only one of the face seal assemblies 300 is discussed in further detail herein.

Through illustrated in use in a track roller assembly 120, the face seal assembly 300 illustrated herein is not limited to usage in around rollers 130 of track roller assemblies 120 and may be used in other rotating components of tracked machines. For example, the face seal assembly 300 may alternatively be used around the idlers and final drive assemblies as well.

Figure 4:
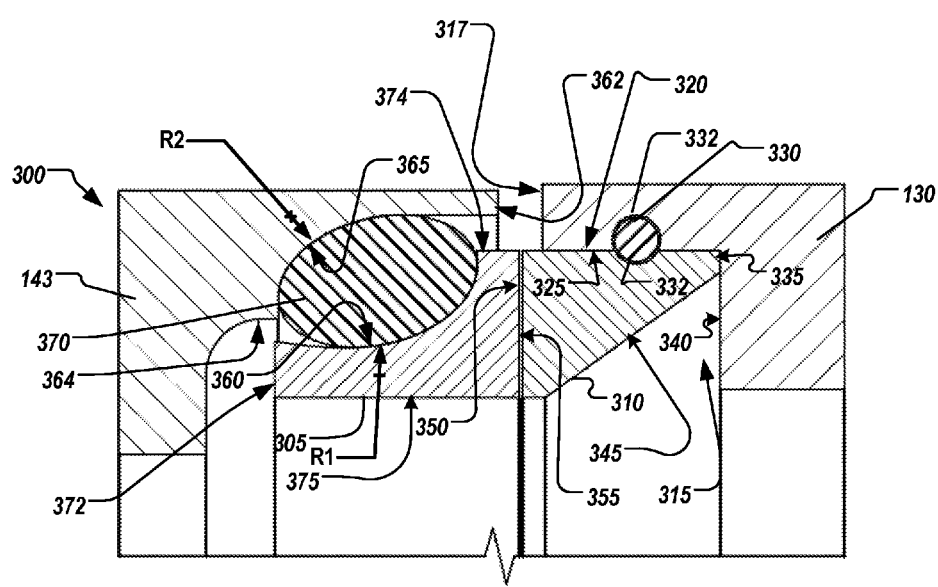
FIG. 4 is an enlarged view of a portion of FIG. 3 illustrating one of the face seal assemblies.

FIG. 4 is an enlarged view of a portion IV of FIG. 3 illustrating one of the face seal assemblies 300. Referring particularly to FIG. 4, the face seal assembly 300 comprises a first, static seal ring 310 and a second, dynamic seal ring 305 each made from metal or other suitable durable, hard material. For example, the static seal ring 310 and the dynamic seal ring 305 may be formed from forged steel alloys, Stellite (a family of cobalt-chromium alloys), or any other material that may be apparent to a person of ordinary skill in the art.

The static seal ring 310 may be press fit into an annular bore 315 formed in an axially outer end 317 of the roller 130 such that the static seal ring 310 is axially fixed with respect to the roller 130 and rotates therewith. The bore 315 formed in the roller 130 forms an annular opening surrounding the static seal ring 310. Specifically, a radially outer surface 320 of the static seal ring 310 extends substantially parallel to a radially inner surface 325 of the bore 315 of the roller 130. The radially outer surface 320 is press-fit against the radially inner surface 325 of the bore 315 to rotate therewith. The press-fit relationship between the radially outer surface 320 of the static seal ring 310 and the radially inner surface 325 of the bore 315 provides sustained contact during rotation of the roller 130. In some embodiments, the sustained contact between the radially outer surface 320 of the static seal ring 310 and the radially inner surface 325 of the bore 315 may occur over 50% or more of the surface area of the radially outer surface of the static seal ring 310. In some embodiments, the sustained contact may occur over 80% or more of the surface area of the radially outer surface of the static seal ring 310.

In some embodiments, an elastomeric O-ring 330 may be positioned radially between the static seal ring 310 and the roller 130 in a groove 332 formed in the radially outer surface 320. In some embodiments, a groove 334 may be formed in the radially inner surface 325 of the bore 315 to retain the elastomeric O-ring 330. The static seal ring 310 may also include an axially inner surface 335, which contacts a portion of an axially outer surface 340 of the bore 315. The static seal ring 310 may also have an angled surface 345 extending radially inward and axially outward from the axially inner surface 335 of the static seal ring 310.

The static seal ring 310 may be sized such that the radially outer surface 320 maintains constant contact between the radially inner surface 325 of the bore 315 of the roller 130. For example, in some embodiments the radially outer surface 320 of the static seal ring 310 may be sized to be press fit against the radially inner surface 325 of the bore 315 with no appreciable gaps. Further, in some embodiments, the elastomeric O-ring 330 may be configured to be compressed between the radially outer surface 320 of the static seal ring 310 and the radially inner surface 325 of the bore 315 to fill in any appreciable gaps.

The dynamic seal ring 305 may have a substantially flat radially inner surface 375. The dynamic seal ring 305 further has an axially outer surface 372 and a radially outer surface 374. The dynamic seal ring 305 may also have a concave surface 360 between the axially outer surface 372 and the radially outer surface 374. The concave surface 360 may be oriented to face the end collar 143. Adjacent the concave surface 360 of the dynamic seal ring 305, the end collar 143 is an annular housing having an axially inner surface 362, a radially inner surface 364, and a concave surface 365 disposed between the axially inner surface 362 and the radially inner surface 364. The concave surface 365 is oriented to face the concave surface 360 of the dynamic seal ring 305.

As illustrated, the concave surface 360 of the dynamic seal ring 305 may have a radius of curvature R1 substantially equal to the radius of curvature R2 of the concave surface 365 of the end collar 143 (i.e., R1=R2). However, example embodiments of the present application may include a concave surface 360 of the dynamic seal ring 305 having a radius of curvature R1 different from the radius of curvature R2 of the concave surface 365 of the end collar 143. For example, in some embodiments, the radius of curvature R1 of the concave surface 360 may be greater than the radius of curvature R2 of the concave surface 365 (i.e. R1>R2). In other embodiments, the radius of curvature R1 of the concave surface 360 may be less than the radius of curvature R2 of the concave surface 365 (i.e. R1<R2)

In some embodiments, the concave surface 360 of the dynamic seal ring 305 may be replaced with another transition region, such as an angled surface, as may be apparent to a person of ordinary skill in the art. Similarly, in some embodiments, the concave surface 365 of the end collar 143 may be replaced with another transition region, such as an angled surface as may be apparent to a person of ordinary skill in the art.

The dynamic seal ring 305 may be confined axially between the static seal ring 310 and the end collar 143. The static seal ring 310 may have a smooth seal face 350 which contacts and engages a smooth seal face 355 on the dynamic seal ring 305. The contacting plane between the seal face 350 of the static seal ring 310 and the seal face 355 of the dynamic seal ring 305 may be referred to herein as the "seal plane". The seal faces 350 and 355 are maintained in constant sealing engagement by way of bias member, such as an elastomeric ring 370 compressed between the concave surface 360 of dynamic seal ring 305 and the concave surface 365 of the end collar 143. As the roller 130 moves axially between the end collars 143, the resilient elastomeric ring 370 applies force against the concave surface 360 of the dynamic seal ring 305, thereby forcing the dynamic seal ring 305 against the static ring 310. As a result, if the static seal ring 310 moves away from the end collar 143, the elastomeric ring 370 provides a biasing force to the dynamic seal ring 305 to bias the dynamic seal ring 305 away from the end collar 143 to thereby maintain the sealing engagement between the seal faces 350 and 355. The biasing force is also transmitted to the static seal ring 310 by the sealing engagement between the seal faces 350 and 355, such that contact engagement is also maintained between the axially inner surface 335 of the static seal ring 310 and the axially outer surface 340 of the bore 315.

The radius of curvatures (R1 and R2) of the concave surface 360 of the dynamic seal ring 305 and the concave surface 365 of the end collar 143 may be selected so that a predetermined compression of the elastomeric ring 370 is maintained. By maintaining a predetermined compression of the elastomeric ring 370, a desired face load (e.g., the biasing force applied to the static seal ring 310 and dynamic seal ring 305) on the seal faces 350 and 355. In some embodiments, the elastomeric ring 370 may be compressed upon assembly to a maximum strain level, which can be substantially maintained throughout the range of movement of the dynamic seal ring 305. For example, in some embodiments, the elastomeric ring 370 may have a maximum strain level of approximately 30% compression, and the compression may be maintained in the range of 29% to 31%, depending on the deflection of the dynamic seal ring 305 relative to the end collar 143. In other embodiments, the compression level may vary based on the desired application as may be apparent to a person of ordinary skill in the art.

Figure 5:
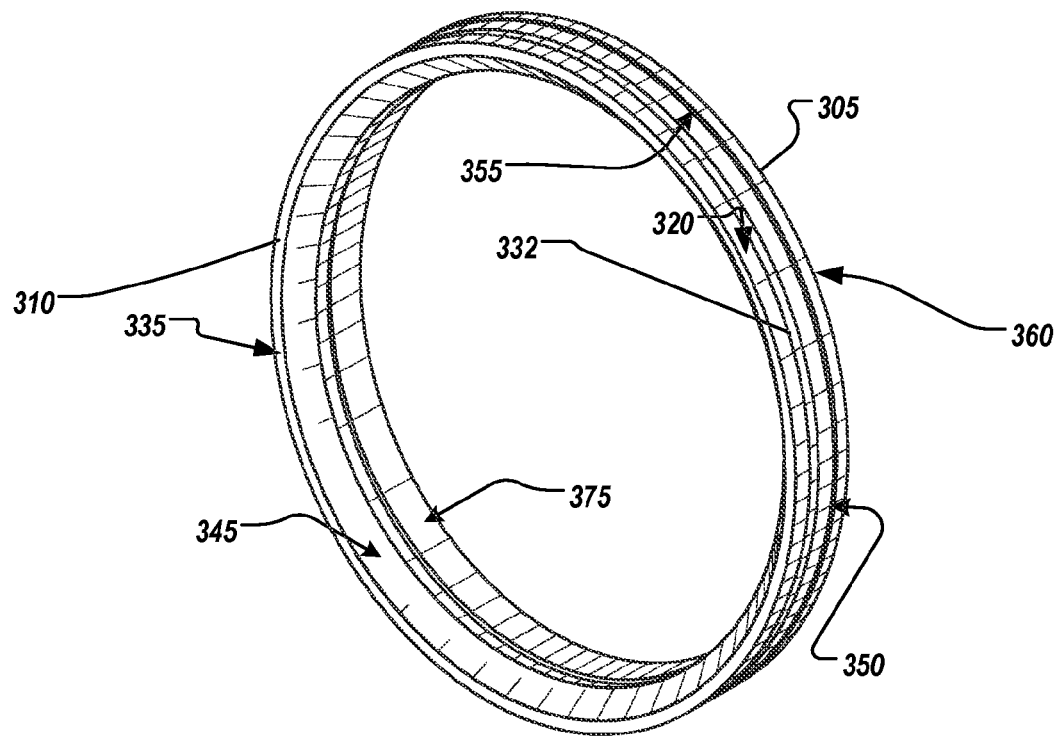
FIGS. 5 and 6 are perspective views of the seal rings of a face seal assembly in accordance with an embodiment of the present application.
Figure 6:
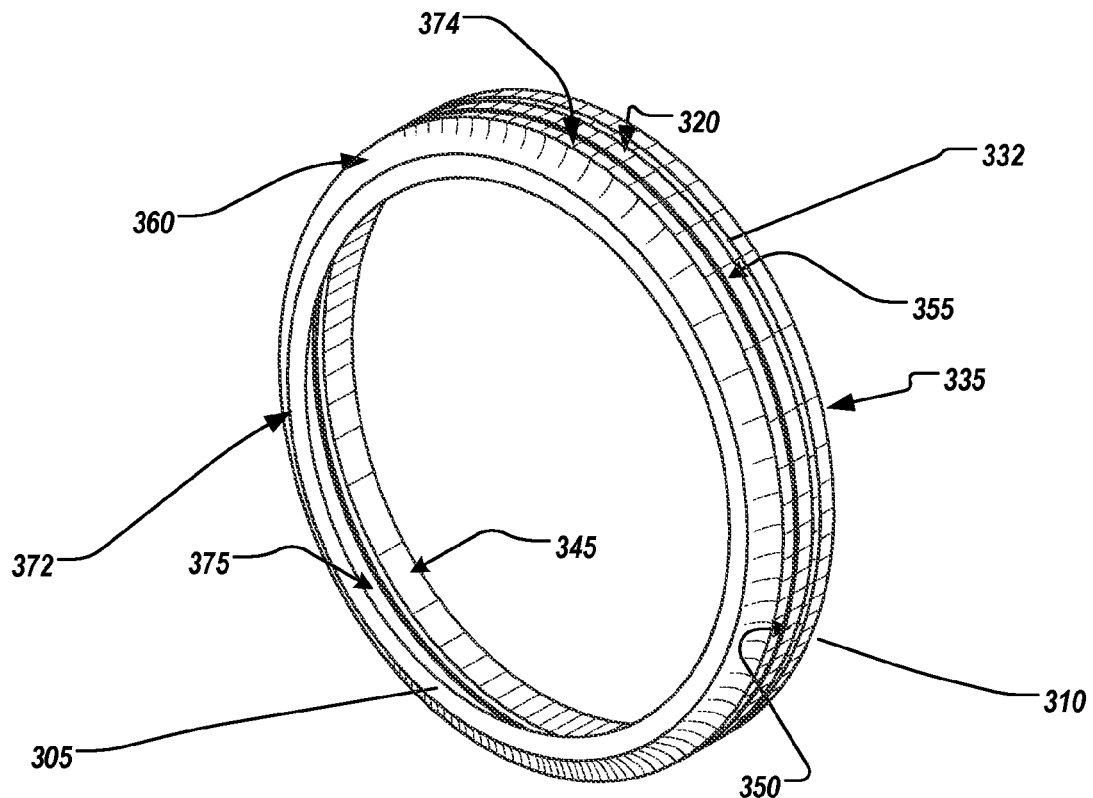

FIGS. 5 and 6 are a perspective view of the static and dynamic seal rings 310 and 305 of a face seal assembly 300 in accordance with an embodiment of the present application. Specifically, FIG. 5 is a perspective view from the axially outer side of the static and dynamic seal rings 310 and 305. Further, FIG. 6 is a perspective view from axially inner side of the static and dynamic seal rings 310 and 305. As illustrated, the static and dynamic seal rings 310 and 305 have been removed from the face seal assembly 300.

The static seal ring 310 has a generally annular shape with the substantially flat radially outer surface 320. In some example embodiments, the radially outer surface 320 may extend parallel to the axis A of the roller shaft 140. In other example embodiments, radially outer surface 320 may be angled (e.g., by between 0° and 5°) with respect to the axis A of the roller shaft 140. In some example embodiments, a groove 332 may be formed in the radially outer surface 320. The static seal ring 310 may also have a substantially flat axially inner surface 335 and an angled, surface 345 adjacent the axially inner surface 335. In some example embodiments, the axially inner surface 335 may extend parallel to the radius R of the roller shaft 140. In other example embodiments, the axially inner surface 335 may be angled (e.g., 0° and 5°) with respect to the radius R of the roller shaft 140. Static seal ring 310 may also have an axially outer surface that defines a seal face 350.

The dynamic seal ring 305 also has a generally annular shape with a concave surface 360 adjacent an axially outer side of the dynamic seal ring 305. The concave surface 360 may connect the axially outer surface 372 of the dynamic seal ring 305 to the radially outer surface 374 of the dynamic seal ring 305. The dynamic seal ring 305 also has a substantially flat radially inner surface 375. The axially inner surface of the dynamic seal ring 305 defines another seal face 355. As discussed above, the seal face 350 of the static seal ring 310 engages the seal face 355 of the dynamic seal ring 305.

INDUSTRIAL APPLICABILITY

In use, the face seal assemblies 300 may prevent leakage of lubricant from the track roller assembly 120 and prevent foreign matter from reaching the rotating bearing 149. However, during operation, significant heat generation can occur along the contacting plane between the seal face 350 of the static seal ring 310 and the seal face 355 of the dynamic seal ring 305 friction. Excessive heat generation can cause evaporation of the lubricant and more rapid wear of the static and dynamic seal rings 310 and 305. The face seal assembly 300 construction disclosed herein permits heat dissipation by conducting heat from the static and dynamic seal rings 310 and 305 to surrounding areas. The press fitting relationship between the static seal ring 310 and the dynamic seal ring 305 allows heat to be conducted from the dynamic seal ring 305 to the static seal ring 310. Further, the radially outer surface 320 of the static seal ring 310 and the radially inner surface 325 of the bore 315 across a large surface area (50% or more of the radially outer surface 320 of the static seal ring 310) may allow heat to be conducted from the static seal ring 310 to the roller 130, which can serve as a heat sink. The greater the surface area contact between the radially outer surface 320 of the static seal ring 310 and the radially inner surface 325 of the bore 315 the more effective heat dissipation may occur. By using the roller 130 as a heat sink, the useful work-life of the static and dynamic seal rings 310 and 305 may be extending. By extending the useful life of the static and dynamic seal rings 310 and 305, the need to repair the track roller assembly 120 to replace the static and dynamic seal rings 310 and 305 may be reduced, saving time and money.

While certain embodiments have been described, these embodiments have been presented by way of example only, and are not intended to limit the scope of the protection. It will be apparent to those skilled in the art that various modifications and variations can be made to the disclosed filter cartridge and filter systems without departing from the scope of the disclosure. Furthermore, various omissions, substitutions, and changes in the form of the apparatus and systems described herein may be made without departing from the spirit of the protection. The accompanying claims and their equivalents are intended to cover such forms or modifications as would fall within the scope and spirit of the protection. Alternative implementations will be apparent to those skilled in the art from consideration of the specification and practice disclosed herein. It is intended that the specification and examples be considered as exemplary only, with a true scope of the disclosure being indicated by the following claims and their equivalents.

What is claimed is:

1. A face seal assembly for a rotating part, comprising:
   a first seal ring fixed to the rotating part for rotation therewith about an axis, said first seal ring having
      a seal face and
      a radially outer surface, said radially outer surface press-fittingly confronting and in sealing engagement against a radially inner surface of an annular bore formed in the rotating part;
   an annular housing spaced axially inward from said first seal ring and rotationally fixed with respect to said axis, said annular housing having
      an axially inner surface and
      a radially inner surface;
   a second seal ring disposed axially between said first seal ring and said annular housing, said second seal ring having
      a seal face confronting and in mutual sealing engagement with the seal face of said first seal ring to define a seal plane between the seal faces, wherein substantially all of the seal face of the first seal ring is in sealing engagement with substantially all of the seal face of the second seal ring; and
   a bias member compressed between the annular housing and the second seal ring.

2. The face seal assembly of claim 1, wherein the radially outer surface of the first seal ring extends parallel to the axis, and provides sustained contact with the radially inner surface of the annular bore formed in the rotating part across 50% or more of the radially outer surface of the first seal ring.

3. The face seal assembly of claim 1, wherein the first seal ring further comprises a groove formed in the radially outer surface; and
   wherein the face seal assembly further comprises an elastomeric O-ring, said O-ring being located in the groove formed in the radially outer surface of the first seal ring.

4. The face seal assembly of claim 1, wherein the annular housing further comprises a transition region between the axially inner surface and the radially inner surface, said transition region having a variable radius;
    wherein the second seal ring further comprises an axially outer surface, a radially outer surface and a transition region between the axially outer surface and the radially outer surface, said transition region having a variable radius.

5. The face seal assembly of claim 4, wherein the bias member is positioned between the transition region of the annular housing and the transition region of the second seal ring.

6. The face seal assembly of claim 4, wherein at least one of the transition region of the annular housing and the transition region of the second seal ring is a concave surface.

7. The face seal assembly of claim 1, wherein the rotating part is a rotating component of a tracked machine.

8. A face seal assembly for a rotating part, comprising:
    a first seal ring fixed to the rotating part for rotation therewith about an axis, said first seal ring having
        a seal face and
        a radially outer surface, said radially outer surface press-fittingly confronting and in sealing engagement against a radially inner surface of an annular bore formed in the rotating part;
    an annular housing spaced axially inward from said first seal ring and rotationally fixed with respect to said axis, said annular housing having
        an axially inner surface,
        a radially inner surface, and
        a transition region between the axially inner surface and the radially inner surface, said transition region having a variable radius;
    a second seal ring disposed axially between said first seal ring and said annular housing, said second seal ring having
        an axially outer surface,
        a radially outer surface,
        a transition region between the axially outer surface and the radially outer surface, said transition region having a variable radius, and
        a seal face confronting and in mutual sealing engagement with the seal face of said first seal ring to define a seal plane between the seal faces, wherein the seal plane is defined by a substantial entirety of the seal face of the first seal ring and a substantial entirety of the seal face of the second seal ring; and
    a bias member compressed between the annular housing and the second seal ring.

9. The face seal assembly of claim 8, wherein the radially outer surface of the first seal ring extends parallel to the axis, and provides sustained contact with the radially inner surface of the annular bore formed in the rotating part across 50% or more of the radially outer surface of the first seal ring.

10. The face seal assembly of claim 8, wherein the first seal ring further comprises a groove formed in the radially outer surface; and
    wherein the face seal assembly further comprises an elastomeric O-ring, said O-ring being located in the groove formed in the radially outer surface of the first seal ring.

11. The face seal assembly of claim 8, wherein the bias member is positioned between the transition region of the annular housing and the transition region of the second seal ring.

12. The face seal assembly of claim 8, wherein at least one of the transition region of the annular housing and the transition region of the second seal ring is a concave surface.

13. The face seal assembly of claim 8, wherein the rotating part is a rotating component of a tracked machine.

14. A rotating assembly for tracked machine comprising:
    a rotating part rotatable about an axis, said rotating part having
        an axially outer end, and
        an annular bore formed in the axially outer end;
    a first seal ring fixed to the rotating part for rotation therewith, said first seal ring having
        a seal face and
        a radially outer surface, said radially outer surface press-fittingly confronting and in sealing engagement against a radially inner surface of the annular bore formed in the rotating part;
    an annular housing spaced axially inward from said first seal ring and rotationally fixed with respect to said axis, said annular housing having
        an axially inner surface,
        a radially inner surface, and
        a concave surface between the axially inner surface and the radially inner surface, said concave surface having a variable radius;
    a second seal ring disposed axially between said first seal ring and said annular housing, said second seal ring having
        an axially outer surface,
        a radially outer surface,
        a concave surface between the axially outer surface and the radially outer surface, said concave surface having a variable radius, and
        a seal face confronting and in mutual sealing engagement with the seal face of said first seal ring to define a seal plane between the seal faces, wherein all of the seal face of the first seal ring is in sealing engagement with all of the seal face of the second seal ring; and
    a bias member compressed between the concave surface of the annular housing and the concave surface of the second seal ring.

15. The rotating assembly of claim 14, wherein the radially outer surface of the first seal ring extends parallel to the axis, and provides sustained contact with the radially inner surface of the annular bore formed in the rotating part across 50% or more of the radially outer surface of the first seal ring.

16. The rotating assembly of claim 14, wherein the first seal ring further comprises a groove formed in the radially outer surface; and
    wherein the rotating assembly further comprises an elastomeric O-ring, said O-ring being located in the groove formed in the radially outer surface of the first seal ring.

17. The rotating assembly of claim 14, wherein the rotating part is roller in a track roller assembly of a tracked machine; and
    wherein the annular housing is an end collar in the track roller assembly of a tracked machine.

* * * * *